(12) United States Patent
Labun

(10) Patent No.: US 8,966,417 B2
(45) Date of Patent: Feb. 24, 2015

(54) METHOD AND SYSTEM FOR ESTIMATING A DIFFUSION POTENTIAL OF A DIFFUSIVE PROPERTY

(71) Applicant: Trajectory Design Automation Corporation, Kelowna (CA)

(72) Inventor: Andrew Labun, Kelowna (CA)

(73) Assignee: Trajectory Design Automation Corporation, Kelowna, British Columbia (CA)

( * ) Notice: Subject to any disclaimer, the term of this patent is extended or adjusted under 35 U.S.C. 154(b) by 0 days.

(21) Appl. No.: 13/888,208

(22) Filed: May 6, 2013

(65) Prior Publication Data

US 2013/0298099 A1 Nov. 7, 2013
US 2014/0123092 A2 May 1, 2014

Related U.S. Application Data

(60) Provisional application No. 61/643,107, filed on May 4, 2012.

(51) Int. Cl.
*G06F 17/50* (2006.01)

(52) U.S. Cl.
CPC ........ *G06F 17/5072* (2013.01); *G06F 17/5036* (2013.01); *G06F 2217/80* (2013.01)
USPC ............................ 716/110; 716/132; 716/136

(58) Field of Classification Search
USPC ............... 716/110, 132–133, 136; 703/13–14
See application file for complete search history.

(56) References Cited

U.S. PATENT DOCUMENTS

| 7,580,823 | B2 * | 8/2009 | Jakatdar et al. | 703/13 |
| 7,979,829 | B2 * | 7/2011 | Smayling | 716/119 |
| 2002/0010564 | A1 * | 1/2002 | Yokota | 703/2 |
| 2002/0107675 | A1 * | 8/2002 | Shinzawa | 703/2 |
| 2005/0155004 | A1 * | 7/2005 | Miura et al. | 716/4 |
| 2007/0033553 | A1 * | 2/2007 | Katagiri et al. | 716/4 |
| 2007/0192756 | A1 * | 8/2007 | Abrams et al. | 716/19 |
| 2008/0077376 | A1 * | 3/2008 | Belhaddad et al. | 703/13 |
| 2009/0172617 | A1 * | 7/2009 | Huang et al. | 716/5 |
| 2011/0191727 | A1 * | 8/2011 | Fujimura et al. | 716/53 |
| 2013/0289964 | A1 * | 10/2013 | Lu | 703/13 |
| 2014/0195183 | A1 | 7/2014 | Rajput et al. | |

OTHER PUBLICATIONS

Clement et al., "Methodology for Electromigration Critical Threshold Design Rule Evaluation," IEEE Trans. Comput. Aided Design Integr. Circuits Syst. 18(5):576-581 (1999).

(Continued)

*Primary Examiner* — Stacy Whitmore
(74) *Attorney, Agent, or Firm* — LeClairRyan, a Professional Corporation

(57) ABSTRACT

Methods, systems, and techniques for estimating a transient diffusion potential of a diffusive property involve modeling, as a circuit, diffusive behavior of a diffusion region and then simulating operation of the circuit to estimate the transient diffusion potential at a location in the diffusion region by determining circuit potential at a node in the circuit that corresponds to the location in the diffusion region. The circuit has steady-state and transient portions that model the steady-state and transient behavior of the diffusion region, respectively. The transient behavior is modeled using a capacitive circuit element. The diffusive property diffuses linearly within the diffusion region and generation of the diffusive property is distributed within the diffusion region.

36 Claims, 10 Drawing Sheets

(56) References Cited

OTHER PUBLICATIONS

Labun & Jensen, "One-Dimensional Estimation of Interconnect Temperatures," Poster Presentation, International Integrated Reliability Workshop, IRW Final Report pp. 155-158 (2002).

Labun & Jagjitkumar, "Rapid Detailed Temperature Estimation for Highly Coupled IC Interconnect," IEEE Trans. Comput. Aided Design Integr. Circuits Syst. 27(10):1840-1851 (2008).

Teng et al., "iTEM: A Chip-Level Electromigration Reliability Diagnosis Tool Using Electrothermal Timing Simulation," Reliability Physics Symposium, 34th Annual Proceedings., IEEE International, pp. 172-179 (1996).

Wang & Chen, "3-D Thermal-ADI: A Linear-Time Chip Level Transient Thermal Simulator," IEEE Trans. Comput. Aided Design Integr. Circuits Syst. 21(12):1434-1445 (2002).

Goodson &Flik, "Effect of Microscale Thermal Conduction on the Packing Limit of Silicon-on-Insulator Electronic Devices," IEEE Transactions on Components, Hybrids, and Manufacturing Technology 15(5):715-722 (1992).

Labun & Reeve, "CLIMATE (Chip-Level Interwined Metal and Active Temperature Estimator)," IEEE International Conference on Simulation of Semiconductor Processes and Devices, Boston, MA, pp. 23-26 (2003).

Liao et al., "On the Speed of Symbolic Network Analysis of Joule Heating in IC Interconnects," 2nd Microsystems and Nanoelectronics Research Conference, Ottawa, ON, pp. 13-16 (Oct. 14, 2009).

Smy et al., "Transient 3D Heat Flow Analysis for Integrated Circuit Devices Using the Transmission Line Matrix Method on a Quad Tree Mesh," Solid-State Electronics 45:1137-1148 (2001).

Smy et al., "A 3-D Thermal Simulation Tool for Integrated Devices—Atar," IEEE Transactions on Computer-Aided Design of Integrated Circuits and Systems 20(1):105-115 (2001).

Veijola & Andersson, "Combined Electrical and Thermal Parameter Extraction for Transistor Model," Proceedings of ECCTD '97, pp. 754-759 (1997).

International Search Report and Written Opinion for PCT/CA2012/000337, 9 pages (Jul. 16, 2012).

\* cited by examiner

METHOD AND SYSTEM FOR ESTIMATING A DIFFUSION POTENTIAL OF A DIFFUSIVE PROPERTY

CROSS REFERENCE TO RELATED APPLICATION

Pursuant to 35 U.S.C. §119(e), this application claims the benefit of U.S. Patent Application No. 61/643,107, filed May 4, 2012 and entitled "Method and System for Estimating a Diffusion Potential of a Diffusive Property", which is hereby incorporated by reference in its entirety.

TECHNICAL FIELD

The present disclosure is directed at methods, systems, and techniques for estimating a diffusion potential, such as a thermal potential (colloquially referred to as "temperature"), of a diffusive property, such as thermal energy (colloquially referred to as "heat"). More particularly, the present disclosure is directed at estimating a transient diffusion potential obeying linear diffusion; that is, a diffusion potential that is varying with time and whose gradient is a force that is linearly proportional to the flux of the underlying diffusive property.

BACKGROUND

Linear diffusion under various names is used to describe the flux of different diffusive properties. For example, Fick's law describes diffusion of a number of molecules of one gas species within a mixture of several species (the potential is called the concentration or partial pressure); Ohm's law describes the diffusion of electric charge (the electric flux is called electric current, the electric potential is called the voltage); and Fourier's law describes the diffusion of heat in conductors (the thermal potential is called the temperature). The constant of proportionality between the gradient and the flux is called the conductance, e.g. thermal conductance in Fourier's law and electrical conductance in Ohm's law, or diffusivity in Fick's law.

In particular, the effects of heat and its diffusion are becoming increasingly problematic when manufacturing and using integrated circuits (ICs). The dimensions of ICs manufactured using complementary metal-oxide semiconductor (CMOS) technology continue to shrink, which increases their power density. As ICs shrink, their power density tends to increase for two reasons. First, the ICs generally shrink at a rate that is faster than the rate at which their supply voltages decrease. Second, the frequencies at which ICs are operated tend to increase as they shrink, resulting in increasing power losses related to high frequency switching.

Research and development accordingly continue into techniques to address the problems that heat and its diffusion pose to ICs. More generally, research and development continue into ways to more generally apply theories describing linear diffusion to solve various practical problems.

SUMMARY

According to a first aspect, there is provided a method for estimating a diffusion potential of a diffusive property. The method comprises modeling, as a circuit, diffusive behavior of a resistor, wherein a portion of the circuit models the steady-state diffusive behavior of the resistor and another portion of the circuit models transient diffusive behavior of the resistor using a capacitive circuit element representing the diffusive property capacity of the resistor, and wherein the diffusive property diffuses linearly within the resistor and generation or loss of the diffusive property is distributed within the resistor; and estimating the diffusion potential at the endpoints of the resistor by simulating operation of the circuit and determining the circuit potential at nodes in the circuit that correspond to the endpoints of the resistor.

Estimating the diffusion potential at a location within the resistor may be done using the diffusion potential at the endpoints of the resistor.

The circuit may be an electric circuit and the circuit potential may be voltage.

The diffusive property may be transient heat and the diffusive property capacity may be heat capacity.

The capacitive circuit element may be selected such that the heat capacity of the resistor is scaled by a factor representing a quasistatic temperature trajectory between the two nodes of the resistor.

The resistor may be a via and the factor may be approximately 0.5.

The resistor may have $G^{lat} \neq 0$, a temperature distribution $$T(x) = \frac{T^L - T^\infty - (T^0 - T^\infty)\cosh(\xi L)}{\sinh(\xi L)} \sinh(\xi x),$$
$$+ (T^0 - T^\infty)\cosh(\xi x) + T^\infty$$

and the factor may be $$\frac{\cosh(\xi L) - 1}{\xi L \sinh(\xi L)}.$$

According to another aspect, there is provided a method for estimating a transient diffusion potential of a diffusive property that comprises modeling, as a circuit, diffusive behavior of a diffusion region, wherein one portion of the circuit models the steady-state diffusive behavior of the diffusion region and another portion of the circuit models transient diffusive behavior of the diffusion region using a capacitive circuit element representing the diffusive property capacity of the diffusion region, and wherein the diffusive property diffuses linearly within the diffusion region and generation or loss of the diffusive property is distributed within the diffusion region; and simulating operation of the circuit to estimate the transient diffusion potential at a location in the diffusion region by determining circuit potential at a node in the circuit that corresponds to the location in the diffusion region.

The circuit used to model the diffusive behavior may be an electric circuit.

The portion of the circuit that models the steady-state behavior of the diffusion region may comprise a pi-network.

The capacitive circuit element may comprise two capacitors and one of the capacitors may be connected in parallel across each of the ports of the pi-network.

The diffusion region may be a resistor, the diffusion potential may be temperature, voltage of the circuit may model the temperature, charge of the circuit may model heat, and the diffusive property capacity may be heat capacity.

The diffusion region may be an IC interconnect.

The resistor may be adjacent an environment having a uniform reference temperature, and lateral thermal conductance of the resistor relative to the environment may be zero.

The resistor may be adjacent an environment having a uniform reference temperature, lateral thermal conductance of the resistor relative to the environment may be non-zero, and modeling the temperature of the resistor may comprise assuming that temperature distribution at any moment within the resistor is quasistatic.

The resistor may comprise a single electrical net.

Temperature along the length of the resistor may be given by $$T(x) = \frac{T^L - T^\infty - (T^0 - T^\infty)\cosh(\xi L)}{\sinh(\xi L)}\sinh(\xi x)$$
$$+ (T^0 - T^\infty)\cosh(\xi x) + T^\infty$$

and the average temperature of the resistor may be given by $$\bar{T} = (T^0 + T^L)\frac{\cosh(\xi L) - 1}{\xi L \sinh(\xi L)} + T^\infty\left(1 - 2\frac{\cosh(\xi L) - 1}{\xi L \sinh(\xi L)}\right),$$

where $\xi = \sqrt{(G^{lat}/G^{long})}$, $G^{lat}$ is lateral conductance of the resistor, $G^{long}$ is longitudinal conductance of the resistor, L is length of the resistor, $T^0$ is temperature at one end of the resistor, $T^L$ is temperature at another end of the resistor, and $T^{ref}$ is environment reference temperature.

Alternatively, temperature along the resistor may be given by $$T(x) = \frac{I^2 R x^2}{2G^{long}} + \left(\frac{T^L - T^0}{L} + \frac{1}{2}\cdot\frac{\Phi L}{G^{long}}\right)x + T^0$$

and the average temperature of the resistor maybe given by $$\bar{T} = \frac{T^L + T^0}{2} + \frac{\Phi L^2}{12 G^{long}},$$

where $\xi = \sqrt{(G^{lat}/G^{long})}$, $T^\infty = \Phi/G^{lat} + T^{ref}$, $G^{lat}$ is lateral conductance of the resistor, $G^{long}$ is longitudinal conductance of the resistor, L is length of the resistor, $T^0$ is temperature at one end of the resistor, $T^L$ is temperature at another end of the resistor, and $T^{ref}$ is environment reference temperature.

According to another aspect, there is provided a system for estimating a diffusion potential of a diffusive property that comprises a controller; and a non-transitory computer readable medium communicatively coupled to the controller and having encoded thereon statements and instructions to cause the controller to perform any of the foregoing aspects of methods.

According to another aspect, there is provided a non-transitory computer readable medium having encoded thereon statements and instructions to cause a controller to perform any of the foregoing aspects of methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Figure 1:
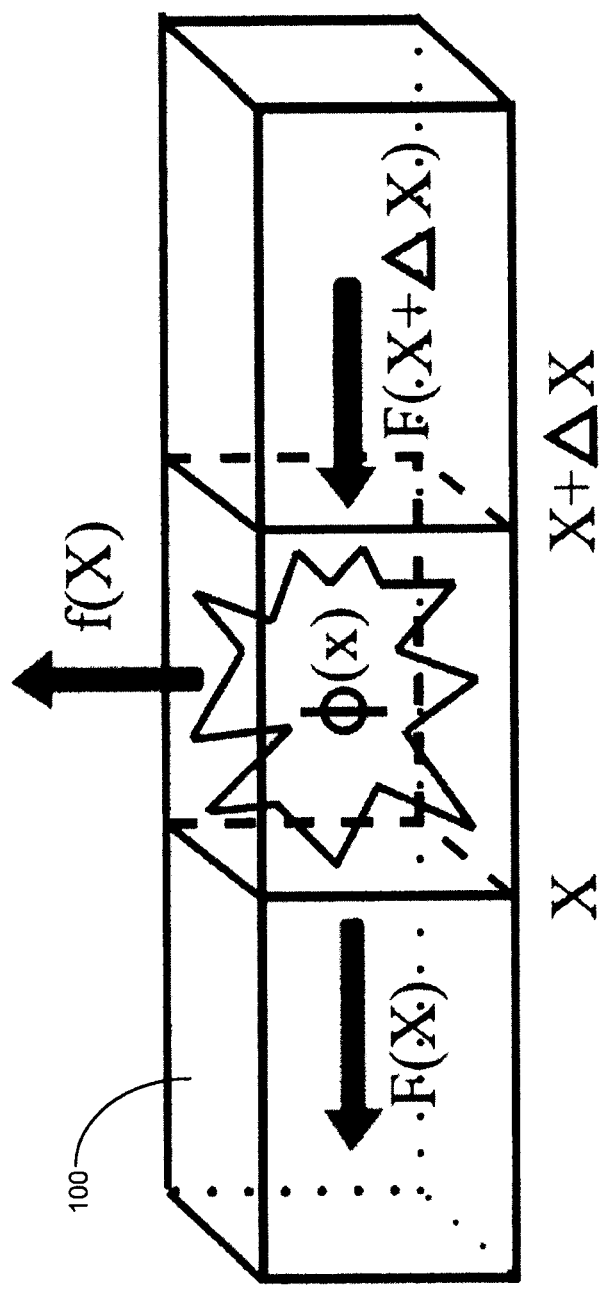
FIG. 1 is a schematic of a resistor illustrating heat flux entering and leaving a differential slice of the resistor.

Directional terms such as "top", "bottom", "left", "right", "front", and "rear" are used in the following description for the purpose of providing relative reference only, and are not intended to suggest any limitations on how any article is to be positioned during use, or to be mounted in an assembly or relative to an environment.

Electromigration in ICs can prejudice their reliability. Electromigration refers to the migration and resulting degradation of portions of metallic conductors over time in response to both current flowing through the conductors and to relatively high temperatures to which the conductors are exposed. Since current flowing through a conductor generates heat in a distributed fashion throughout the conductor, high temperatures and current are closely linked in practice. By a "distributed fashion", in this example it is meant that heat is generated throughout the conductor, and not simply, for example, at the endpoints of the conductor.

The degree to which ICs are susceptible to electromigration depends on their layout. Accurately predicting the effect an IC's layout will have on its operating temperature can be difficult. Unfortunately, if a problem with an IC's layout is found only after tape-out, the costs in terms of both time and money of subsequently changing the layout to rectify the problem are relatively high.

Some of the embodiments discussed herein are directed at a method and system for estimating thermal potential, also referred to herein as "temperature", of thermal energy, also referred to herein as "heat".

In some embodiments directed at modeling temperature of electric circuits, the transient (i.e. non steady-state, or time varying) temperature at various points in a resistive element (hereinafter interchangeably referred to as a "resistor") is determined at various times. In these embodiments, a "resistor" is not limited to a discrete, two-terminal electrical component that ideally has only a real impedance, but rather to any electrical component whose impedance has a real component. For example, and as illustrated in the examples below, a "resistor" includes vias (in both ICs and printed circuit boards [PCBs]), contacts, circuit traces on PCBs, and interconnects within ICs. These embodiments utilize a model that take into account that heat is generated in a distributed fashion along the resistor.

More generally, in alternative embodiments the diffusion potentials of different types of diffusive properties may be estimated, so long as the diffusive property is generated or lost in a distributed fashion and diffuses linearly throughout the region through which it may diffuse ("diffusion region"). For example, in one alternative embodiment a tube of length L is open at both ends and has an inner surface that is coated with a catalyst. The tube is filled with a reactive gas and sustains a chemical reaction on its interior surface that releases a gaseous product. If the tube forms part of a larger system of connected tubes, it may be convenient to model the tube as a single entity with two ends. The rate of generation of the gaseous product and its concentration, which is the diffusion potential, results from chemical activity within the tube. In this example, the underlying diffusive property is the number of particles of the gaseous product and the diffusion region is the volume within the tube. In another alternative embodiment, a long iron bar is fixed at both ends to permafrost, but is exposed to sunlight. Heat is accordingly introduced to the portion of the bar exposed to sunlight. Heat is conducted through the two ends of the bar into the bodies that anchor it, making it likely to melt the permafrost. In this embodiment, the temperature of the bar is the diffusion potential and the diffusive property is heat, and the diffusion region is the bar itself through which heat may be conducted. These embodiments utilize a model that takes into account that the diffusive property is generated or lost in a distributed fashion throughout the diffusion region, and not just at discrete locations, such as the endpoints, of the diffusion region.

Heat Equation

A model for heating in a resistor 100, as shown in FIG. 1, is first derived. For the purposes of this model, the resistor 100 is presumed to be of uniform width and composition, and to have constant temperature over any cross-section taken perpendicularly to its length.

The heat per unit length in a differential slice of the resistor is $mC_p T(x) \Delta x$, where the length of the differential slice is $\Delta x$, $T(x)$ is the temperature along the resistor's length, $m$ is the mass of the resistor per unit length, and $C_p$ is the heat capacity of the resistor. The time rate of change of the heat is then given by $$mC_p \frac{\partial T}{\partial t} \Delta x = F(x + \Delta x) - F(x) + \phi(x)\Delta x - f(x)\Delta x \quad (1)$$

where $F(x)$ is the diffusive heat flux. The heat flux is oriented along the resistor 100's length and is related to the temperature gradient by Fourier's law of heat conduction:

$$F(x) = G^{long} \frac{\partial T(x)}{\partial x} \quad (2)$$

where $G^{long}$ is the longitudinal thermal conductance of the resistor 100.

The Joule heat generated per unit length of the resistor 100 is given by $\phi = I_{rms}^2 R$; R is the resistor 100's electrical resistance per unit length, which is assumed to be constant within the resistor 100, and $I_{rms}$ is the time-averaged rms current flowing through the resistor 100. The function $f(x)$ in Equation 1 models the heat flux through the sides of the resistor 100 to the environment, which is at a reference temperature $T^{ref}$. An exemplary environment is a substrate on which the resistor 100 is mounted; for example, when the resistor 100 is an IC interconnect segment, the environment may be the IC's substrate 202 (shown in FIG. 2). If diffusive heat flux passes through the sides of the resistor 100 to the environment, which is held constant at the reference temperature $T^{ref}$ (established, for example, by a full-chip temperature simulation including device heating), then a lateral thermal conductance $G^{lat}$ per unit length of the resistor 100 may be defined as follows:

$$f(x) = G^{lat}(T(x) - T^{ref}) \quad (3)$$

Transient Analysis Embodiment

Heat Equation on a Macroscopic Element

Building on the discussion above, the following embodiment is directed at a method and system for estimating a diffusion potential of a diffusive property that is transient, or evolving, in nature (the "transient embodiment"). For example, the transient embodiment can be used to estimate temperature at a location within an electric circuit in which the temperature is varying with time because, for example, the circuit has not been operating for sufficiently long to reach a steady-state temperature, or because the circuit includes time-varying independent current and voltage sources. The following embodiment utilizes one example of the resistor 100, an interconnect segment 200, as an exemplary diffusion region, but is applicable to other types of diffusion regions as well.

Figure 2:
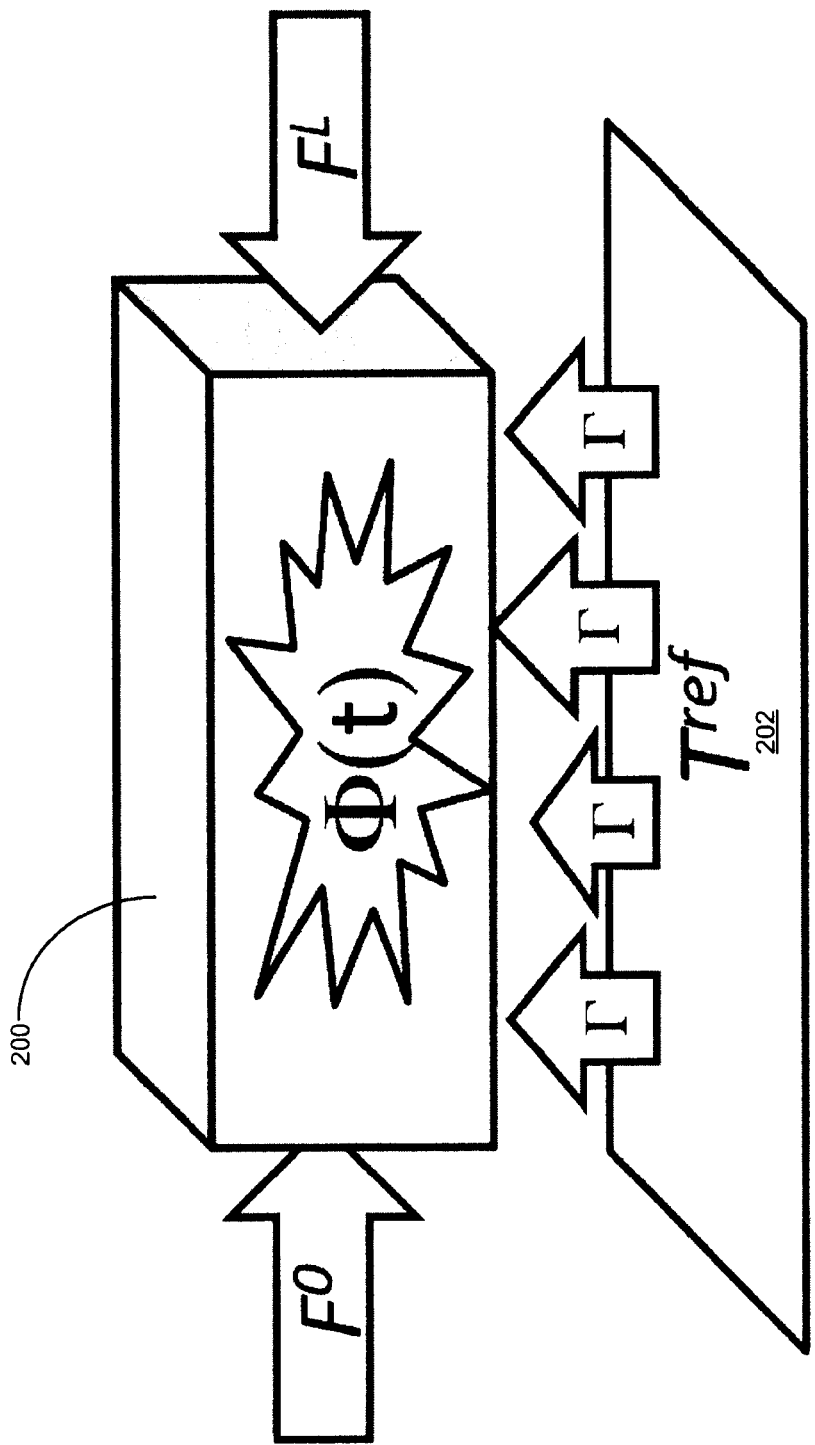
FIG. 2 is a schematic of a resistor illustrating heat flux entering and leaving a macroscopic view of the resistor.

Consider a macroscopic (i.e. not a differential slice), one-dimensional body, such as the interconnect segment 200 shown in FIG. 2. In FIG. 2, the segment 200 extends along an x-axis such that 0<x<L, where L is the length of the segment 200. The segment 200 has an internal heat source $\Phi(x,t)$ (representing, for example, heat generated from electric current), with heat flows $F^0$ and $F^L$ at its ends and heat flow $\Gamma$, which is the heat flow conducted to $T(x)$ from the substrate 202, which is at a uniform reference temperature $T^{ref}$. The segment 200 has an electric current i(t) flowing from one end to the other and the following material properties:

(i) a mass per unit length (kg/μm) of "m";
(ii) a heat capacity (J/kg·K) of "$C_p$";
(iii) an electrical resistance per unit length (Ω/μm) or "R";
(iv) a longitudinal thermal conductance times length L (W·μm/K) of "$G^{long}$"; and
(v) a lateral thermal conductance to the substrate 202 at temperature $T_{ref}$ per unit length (W/μm·K) of "$G^{lat}$".

The values of mass "m" and heat capacity "$C_p$" are adjustable to better model the heat content of the segment 200 being modeled and some portion of its immediate surroundings.

Then the component heat flows into the segment 200 are as follows:

$$F^0 = -G^{long} \frac{\partial T}{\partial x}\bigg|_{x=0} \quad (4)$$

$$F^L = G^{long} \frac{\partial T}{dx}\bigg|_{x=L} \quad (5)$$

$$\Gamma = -G^{lat}\left(\int_0^L (T(x) - T^{ref})dx\right) \quad (6)$$

$$= -G^{lat} L(\overline{T} - T^{ref}) \quad (7)$$

$$\Phi = i(t)^2 R \quad (8)$$

Equation (8) reflects that heat is presumed to be generated uniformly throughout the segment 200; however, in alternative embodiments (not depicted), heat (or another diffusive property) may be generated or lost non-uniformly within the segment 200. For example, resistance may vary with location along the segment 200, which would likely prevent uniform heat generation. The average temperature T rises or falls due to the net flow of heat into, and generation of heat within, the segment 200:

$$mC_p \frac{d\overline{T}}{dt} = \int_0^L mC_p \frac{\partial T}{\partial t} dx = F^0 + F^L + \Gamma + \Phi L \qquad (9)$$

When $G^{lat} \neq 0$, a quasistatic assumption can be made such that the temperature distribution at any moment within the segment 200 follows the following steady-state form:

$$T(x) = \frac{T^L - T^\infty - (T^0 - T^\infty)\cosh(\xi L)}{\sinh(\xi L)} \sinh(\xi x) \qquad (10)$$
$$+ (T^0 - T^\infty)\cosh(\xi x) + T^\infty$$

where $\xi = \sqrt{(G^{lat}/G^{long})}$ and $T^\infty = \Phi/G^{lat} + T^{ref}$. Generally, making a "quasistatic assumption" refers to assuming the solution to a transient problem is the solution to the corresponding steady-state ("static") problem.

Then the average temperature at any time over the length of the segment 200 is:

$$\overline{T} = (T^0 + T^L)\frac{\cosh(\xi L) - 1}{\xi L \sinh(\xi L)} + T^\infty \left(1 - 2\frac{\cosh(\xi L) - 1}{\xi L \sinh(\xi L)}\right) \qquad (11)$$

When $G^{lat} = 0$, the temperature distribution within the segment 200 is:

$$T(x) = \frac{I^2 R x^2}{2G^{long}} + \left(\frac{T^L - T^0}{L} + \frac{1}{2} \cdot \frac{\Phi L}{G^{long}}\right) x + T^0 \qquad (12)$$

And the average temperature at any time over the length of the segment 200 is:

$$\overline{T} = \frac{T^L + T^0}{2} + \frac{\Phi L^2}{12 G^{long}} \qquad (13)$$

The treatment of the heat equation on macroscopic elements, as shown in FIG. 2, rather than differential elements, as shown in FIG. 1, is possible because of the quasistatic assumption. This makes it possible to exploit the results of the steady-state analysis, as discussed in relation to FIG. 1, including the expressions for average temperature on the segment 200.

Thermal Capacitance

As discussed above, when an electric circuit is used to model heat generation and subsequent diffusion, the circuit analogy for temperature is electric potential (V), and for heat is electric charge (q). The time-dependent statement of Kirchoff's Current Law (KCL) at a node j is:

$$0 = \frac{d}{dt} \sum_{capacitors\ at\ j} q_{capacitor} + \sum_{other\ elements\ at\ j} i_{element} \qquad (14)$$

The expression for the capacitive terms is:

$$C \frac{dV}{dt} = \frac{dq}{dt} = i \qquad (15)$$

Equation 15 is directly analogous to Equation 9 and the charging of the capacitor is akin to raising the average temperature of the segment 200. The analogy is thus $$mC_p \frac{d\overline{T}}{dt} \sim C \frac{dV}{dt} \qquad (16)$$

For elements obeying Equation 11:

$$mC_p \left(\frac{dT^0}{dt} + \frac{dT^L}{dt}\right) \frac{\cosh(\xi L) - 1}{\xi L \sinh(\xi L)} \sim C \frac{dV}{dt}$$

which says that raising the average temperature of the segment 200 is tantamount to raising the temperatures at the two nodes at lengths 0 and L of the segment 200, as if there were an equivalent capacitor γ ("thermal capacitor γ") at each of these nodes, with the value $$\gamma = mC_p \frac{\cosh(\xi L) - 1}{\xi L \sinh(\xi L)} \qquad (17)$$

For elements obeying Equation 13:

$$\frac{1}{2} mC_p \left(\frac{dT^0}{dt} + \frac{dT^L}{dt}\right) \sim C \frac{dV}{dt}$$

which leads to the equivalent thermal capacitor $$\gamma = \frac{1}{2} mC_p \qquad (18)$$

A thermal capacitor is then added to the equivalent pi-network for the segment 200 as described by either Equation 10 ($G^{lat} \neq 0$) or Equation 12 ($G^{lat} = 0$), as depicted in FIGS. 3(*a*) and (*b*), respectively. FIG. 3(*a*) shows the equivalent pi-network for the segment 200, while FIG. 3(*b*) shows the equivalent pi-network for vias/contacts. In both FIGS. 3(*a*) and (*b*), the portion of the pi-network that models steady-state diffusive behaviour ("steady-state portion 302") is enclosed within a dashed box, while the portion of the pi-network not within the dashed box models the transient diffusive behavior ("transient portion"), and in FIGS. 3(*a*) and (*b*) comprises the thermal capacitors γ at the nodes corresponding to lengths 0 and L of the segment 200 (FIG. 3(*a*)) and via/contact (FIG. 3(*b*)). The pi-networks for segments 200 extracted from a layout may be assembled into a net. By a "net", it is meant one or more segments 200 through which a continuous conductive path can be traced. Examples of using electrical pi-networks in interconnect analysis can be found in J. J. Clement, S. P. Riege, R. Cvijetic, and C. V. Thompson, "Methodology for electromigration critical threshold design rule evaluation," IEEE Trans. Comput. Aided Design Integr. Circuits Syst., vol. 18, no. 5, pp. 576-581, May 1999, in Andrew Labun and James Jensen, One-Dimensional Estimation of Interconnect Temperatures, International Integrated Reliability Workshop, Lake Tahoe, 2002 (IRW 2002 Final Report, 155-158), and in Andrew Labun and Karan Jagjitkumar, "Rapid Detailed Temperature Estimation for Highly Coupled IC Interconnect," IEEE Transactions on Computer-Aided Design of Integrated Circuits and Systems, vol. 27, no. 10, pp. 1840-1851, October 2008, the entireties of all of which are hereby incorporated by reference herein.

Figure 3B:
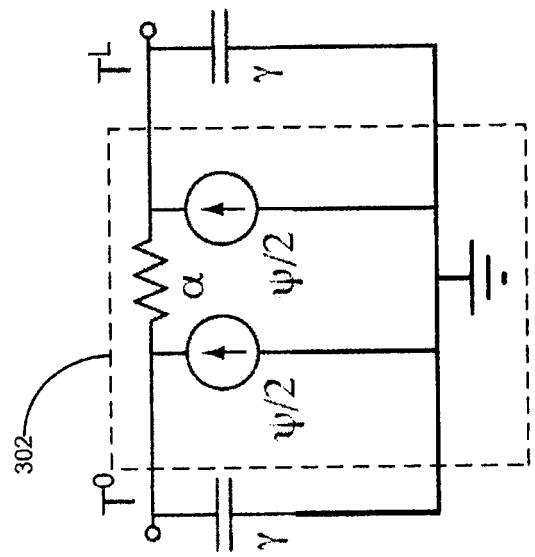
FIGS. 3(a) and (b) are schematics of pi-networks for interconnect segments [FIG. 3(a)] and for vias and contacts [FIG. 3(b)], respectively.
Figure 3A:
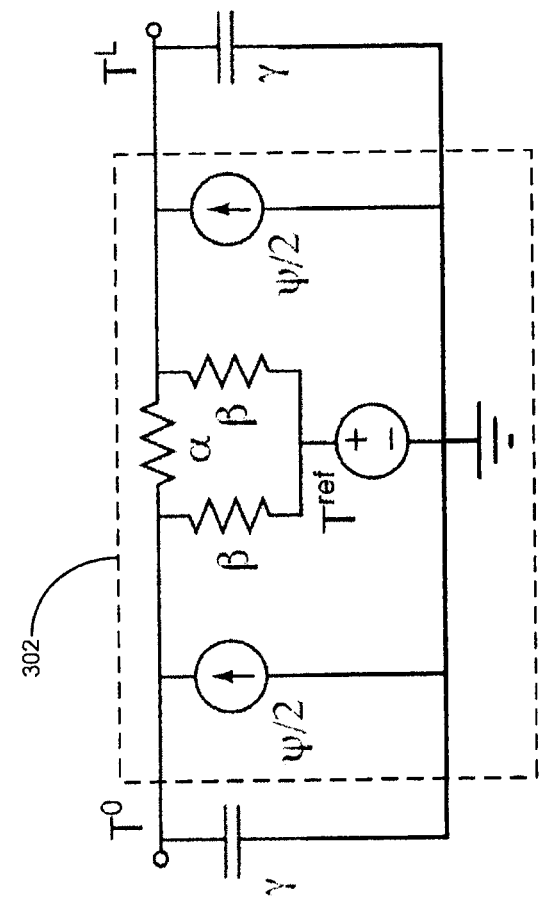

Coefficients for the elements of the pi-network of FIG. 3(a) for the segment 200, which allow it to represent the heat equation, follow:

$$\alpha = \frac{G^{long}\xi}{\sinh(\xi L)}$$

$$\beta = \frac{G^{long}\xi(\cosh(\xi L) - 1)}{\sinh(\xi L)}$$

$$\Psi = \frac{2\Phi(\cosh(\xi L) - 1)}{\xi \sinh(\xi L)}$$

And for the pi-network of FIG. 3(b) for the via/contact:

$$\alpha = \frac{G^{long}}{L}$$

$$\Psi = \Phi L$$

Given a thermal model of the segment 200 that is completely analogous to the electrical model, solving a single net can be performed using a simulator such as SPICE. This can be done using time-varying independent sources.

Example

Figure 4:
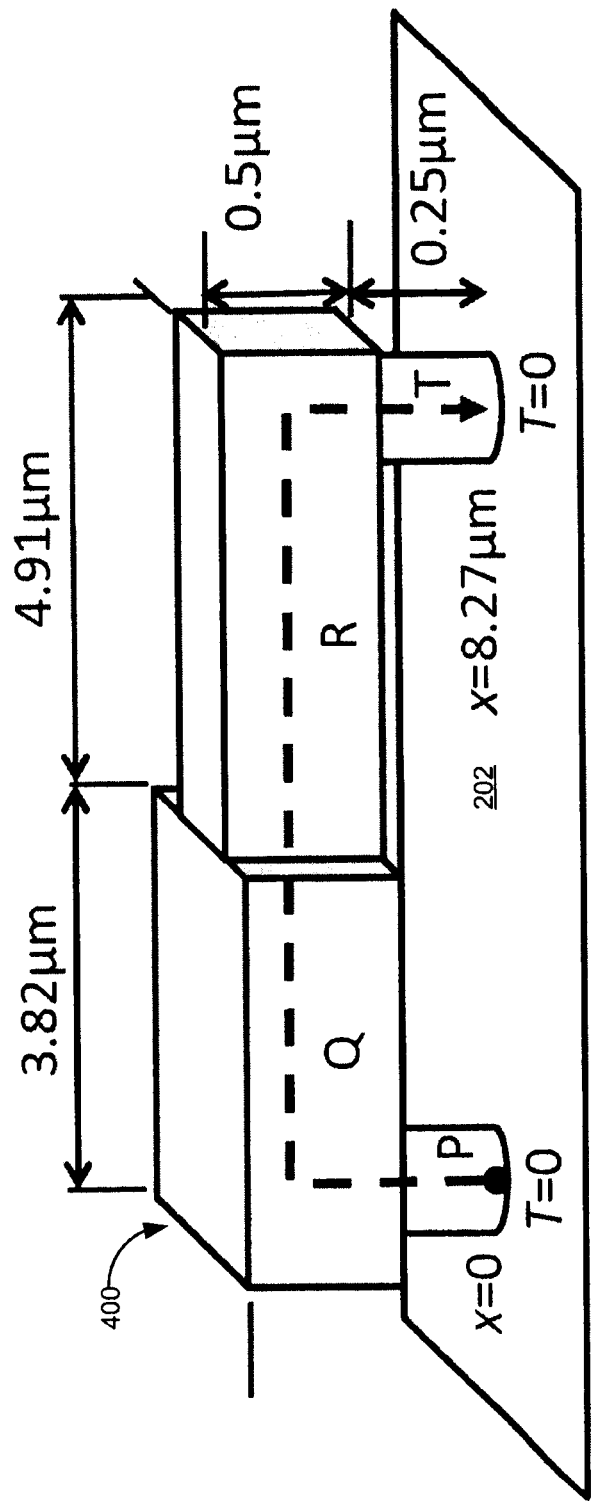
FIG. 4 is a schematic of an interconnect comprising two segments of metal one.

An example involving heating a single net by a current square wave (2 ns period) follows. FIG. 4 shows an interconnect 400 comprising two metal one segments Q,R terminated by contacts P,T. FIG. 4 is not to scale. The two widths of metal one are above the substrate 202 at $T^{ref}=0$. A one-dimensional path along the dashed line shown in FIG. 4 is used to depict the temperature. By convention, the horizontal paths are taken at the mid-height of the interconnect 400, resulting in the interconnect 400's length L being artificially lengthened. The mass m and resistance R of the interconnect 400 are taken from the drawn dimensions of the interconnect 400 and stretched over the longer path length.

The interconnect 400 is heated by the current square wave with $I_{rms}=0.707$ mA at 500 MHz. A continuous analysis path is chosen through the interconnect 400 that corresponds to a lumped circuit, with component values calculated from the four discrete bodies extractable from the layout. A thermal technology file based on a generic 0.18 μm CMOS semiconductor process technology is used to generate appropriate component values α, β, γ, and ψ/2. Significant parameters are provided below, which is a SPICE netlist with three nodes used for simulation:

| Transient analysis of 4-segment wire |
|---|
| R1 0 6 378.0k |
| I2 0 6 PULSE(0 7.8u 900ps 100ps 100ps 900ps 2ns) |
| C3 6 0 0.4605p |
| C4 6 0 1.024p |
| I5 0 6 PULSE(0 0.250u 900ps 100ps 100ps 900ps 2ns) |

| Transient analysis of 4-segment wire |
|---|
| V6 4 0 0 |
| V7 3 0 0 |
| R8 6 4 1.663Meg |
| R9 6 2 53.1k |
| R10 2 4 1.663Meg |
| I11 0 2 PULSE(0 0.250u 900ps 100ps 100ps 900ps 2ns) |
| C12 2 0 1.024p |
| C13 2 0 3.575p |
| I14 0 2 PULSE(0 0.0462u 900ps 100ps 100ps 900ps 2ns) |
| R15 2 3 819.6k |
| R16 2 1 9.747k |
| I17 0 1 PULSE(0 0.0462u 900ps 100ps 100ps 900ps 2ns) |
| R18 1 3 819.6k |
| C19 1 0 3.575p |
| C21 1 0 0.4605p |
| I23 0 1 PULSE(0 7.8u 900ps 100ps 100ps 900ps 2ns) |
| R25 1 0 378.0k |
| *Analysis commands |
| * |
| .TRAN 1ns 6000ns |
| .PRINT TRAN V(1) V(2) V(6) |
| .end |

Figure 5:
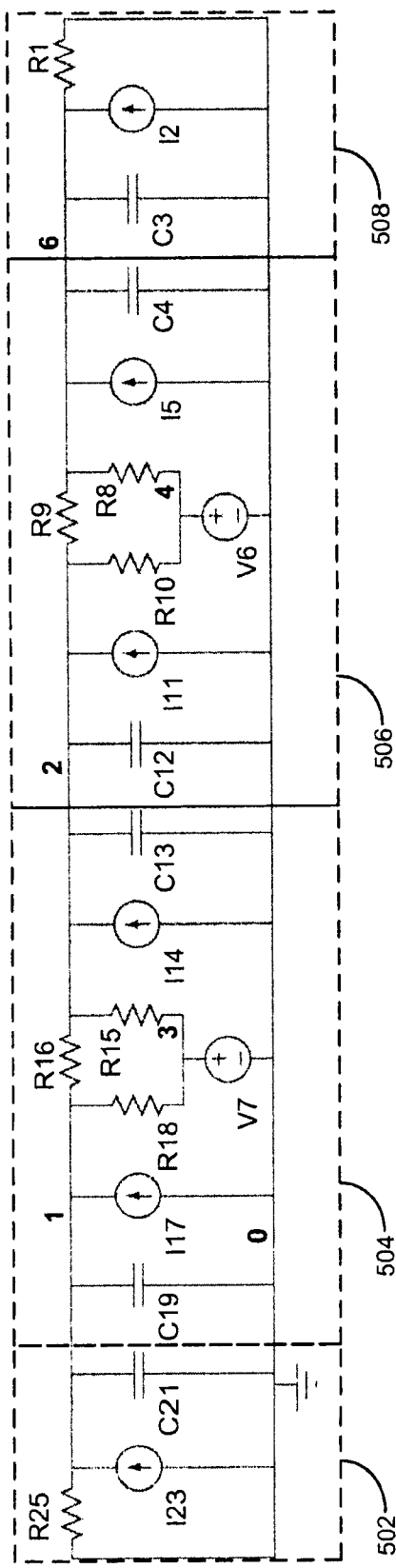
FIG. 5 is a schematic of a circuit used to model the interconnect of FIG. 4.

A circuit 500 corresponding to the netlist is shown in FIG. 5. First through fourth dashed boxes 502,504,506,508 are shown in FIG. 5, each enclosing a different portion of the circuit 500: the first dashed box 502 encircles the portion of the circuit 500 that models the thermal behavior of one of the contacts P at x=0; the second dashed box 504 encircles the portion of the circuit 500 that models the thermal behavior of the shorter of the segments Q; the third dashed box 506 encircles the portion of the circuit 500 that models the thermal behavior of the longer of the segments R; and the fourth dashed box 508 encircles the portion of the circuit 500 that models the thermal behavior of the other of the contacts T. The portions of the circuit that model the contacts P,T include only half of the pi-networks of FIG. 3(b) because one end of each of the contacts is connected to the substrate 202 (thermal ground), which nullifies the effect of the thermal capacitor γ and current source Ψ/2 connected to (i) the node corresponding to temperature reference $T^0$ in FIG. 3(b) for contact P; and (ii) the node corresponding to temperature reference $T^L$ in FIG. 3(b) for contact T.

Figure 6A:
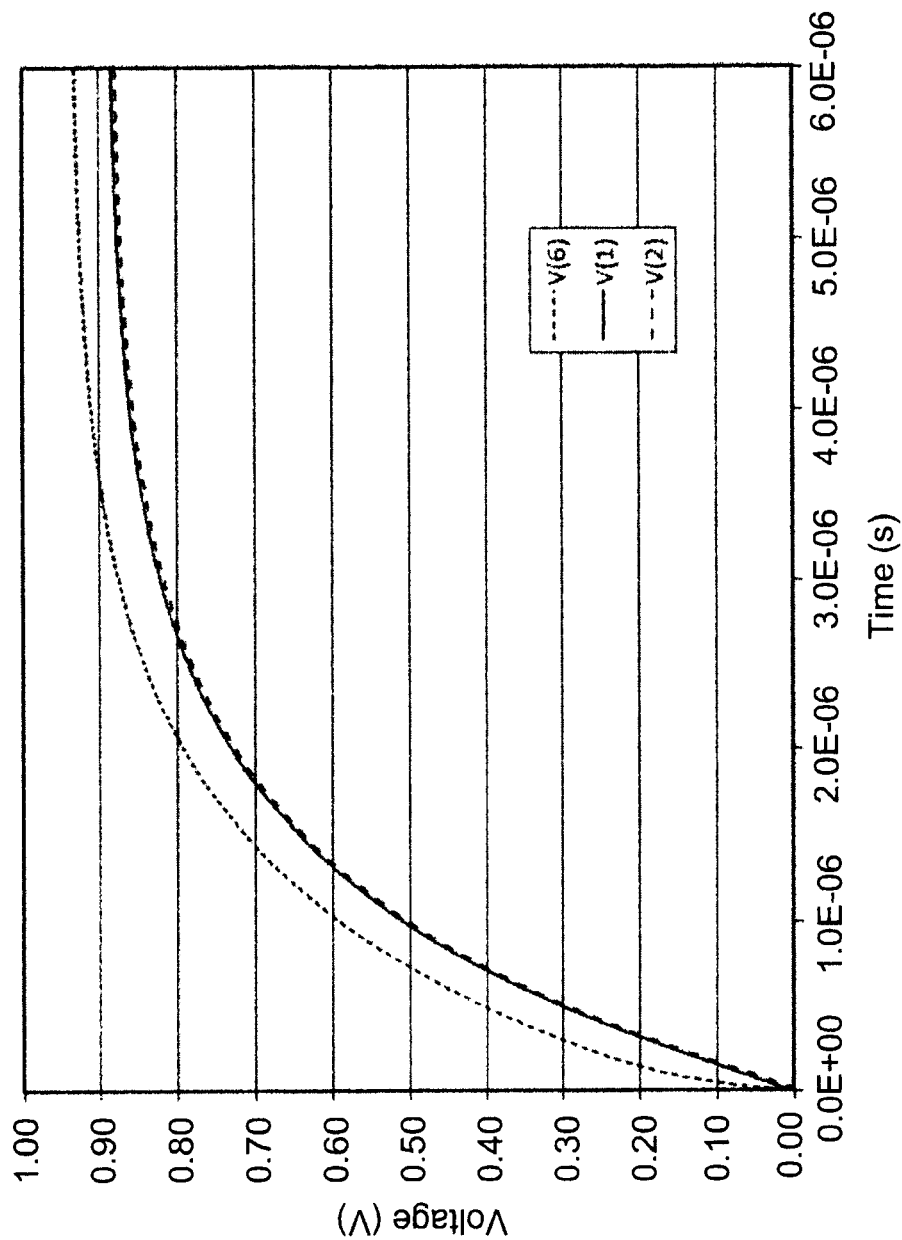
FIGS. 6(a) and (b) are graphs showing the results of a SPICE simulation of the circuit of FIG. 5, in which the temperature of the interconnect being modeled is transient during the simulation.
Figure 6B:
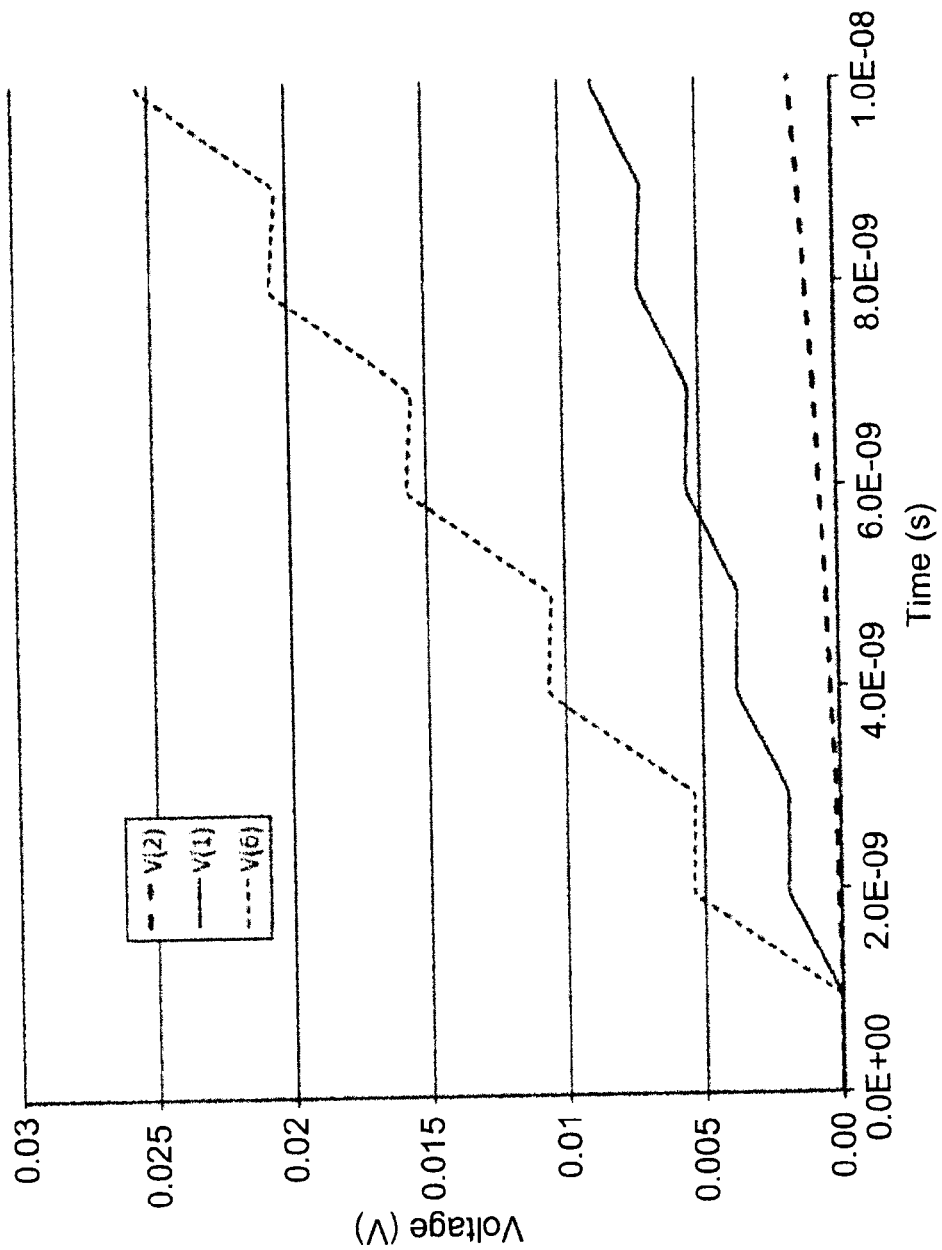

The thermal evolution as determined by SPICE shows the levelling-out of the temperatures to the steady-state values; this is depicted in FIG. 6(a). The first 10 ns of the SPICE run, which is shown in FIG. 6(b), shows the temperature of these nodes being ratcheted up by consecutive heat pulses (analogous to current pulses in the equivalent circuit of FIG. 5).

Figure 7:
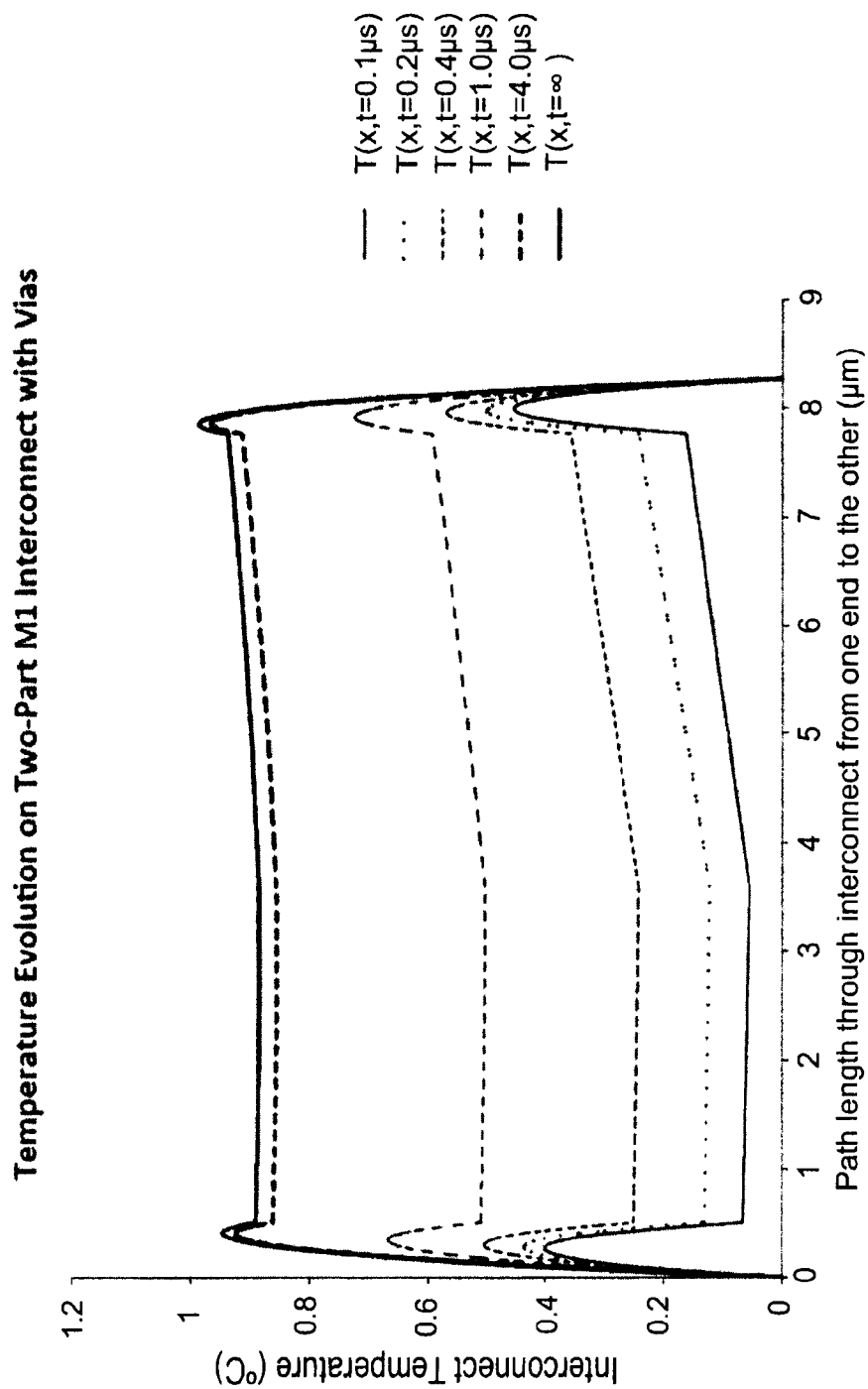
FIG. 7 shows the time evolution of the temperature trajectory of the interconnect of FIG. 4.

The temperature trajectories along the dashed path shown in FIG. 4 are then determined by evaluating Equations 10 and 12 at different time steps; the results are shown in FIG. 7. This corresponds to estimating the diffusion potential at a location within the interconnect 400 from the diffusion potential at the endpoints of the interconnect 400 using the appropriate formula (Equations 10 and 12, depending on $G^{lat}$) for resistor temperature. The final trajectory, corresponding to $T(x,t=\infty)$, agrees with the steady-state analysis. The curved temperature trajectories shown in FIG. 7 arise from Equations (10)-(13) taking into account that heat within the interconnect 400 is generated in a distributed manner. The expressions for γ, which governs the rate at which temperature changes with time, in Equations (17) and (18) are valid for specific curved temperature trajectories.

In FIG. 7, the maximal temperatures near the two ends of the curves are due to the relatively high resistance in the contacts P,T. They don't conduct heat laterally in this model utilized in the present embodiment, so all heat is conducted through their ends, creating an interior maximum. The temperature minimum is somewhere far from the contacts' P,T connection to the interconnect 400, and thus the temperatures slope down towards the midpoint of the curves. However, the thermal resistances in the two segments Q,R are unequal and so the slopes differ. The minimum temperature is at the junction between the two segments Q,R until near steady-state; this is due to the non-differential treatment of the interconnect 400. The thermal capacitors in FIG. 5 act as localized heat sinks. To the extent that the quasistatic approximation is valid, the resulting trajectory is true at every time step and true in space. However, if the thermal trajectory is not actually well represented by the static solution, local minima will appear in the trajectory at joints between segments where the thermal capacitance is placed.

Figure 8:
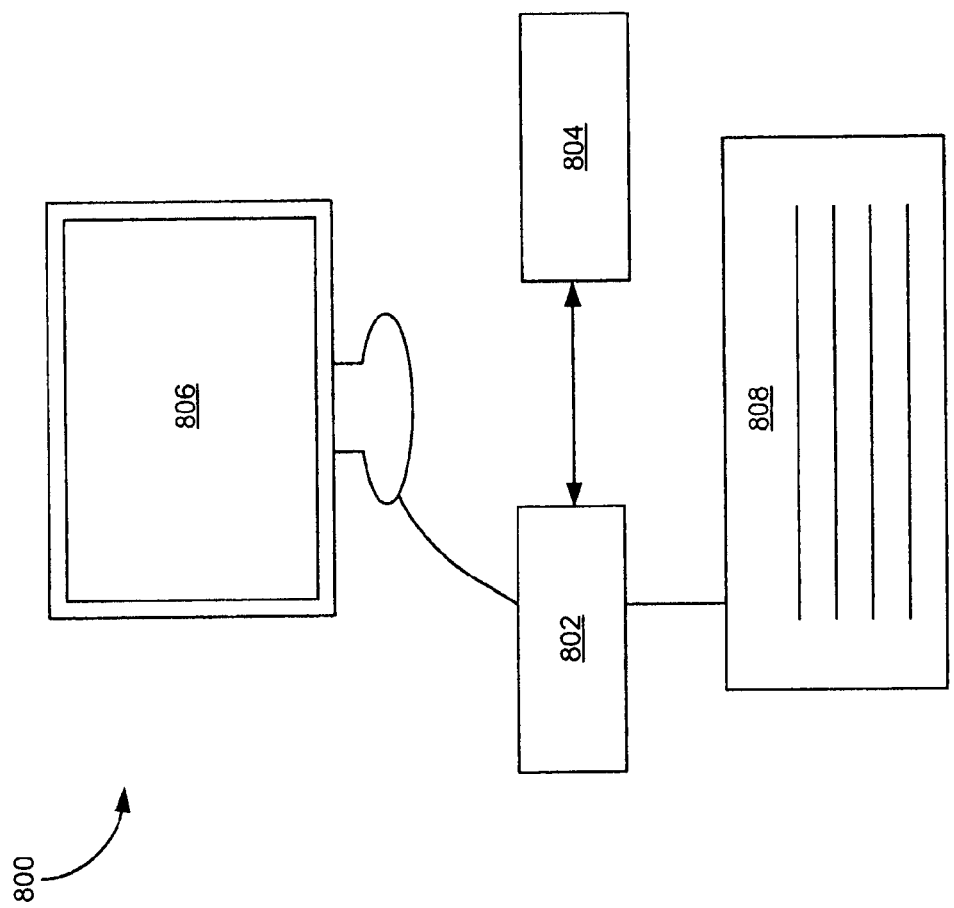
FIG. 8 shows a system for estimating a transient diffusion potential, according to another embodiment.

As alluded to above, a controller can be used to perform the time-transient method. A system 800, such as the one shown in FIG. 8, can be configured to perform the transient embodiment by encoding a computer readable medium 804 with statements and instructions to cause a controller 802 to perform the transient embodiment described above. A person can interact with the controller using a keyboard 808 and display 806, which also form part of the system 800. The controller 802 may be any suitable type of controller, such as a processor, microcontroller, programmable logic controller, field programmable gate array, application-specific integrated circuit, or system on a chip. Exemplary computer readable media are non-transitory and include disc-based media such as CD-ROMs and DVDs, magnetic media such as hard drives and other forms of magnetic disk storage, semiconductor based media such as flash media, random access memory, and read only memory.

Figure 9:
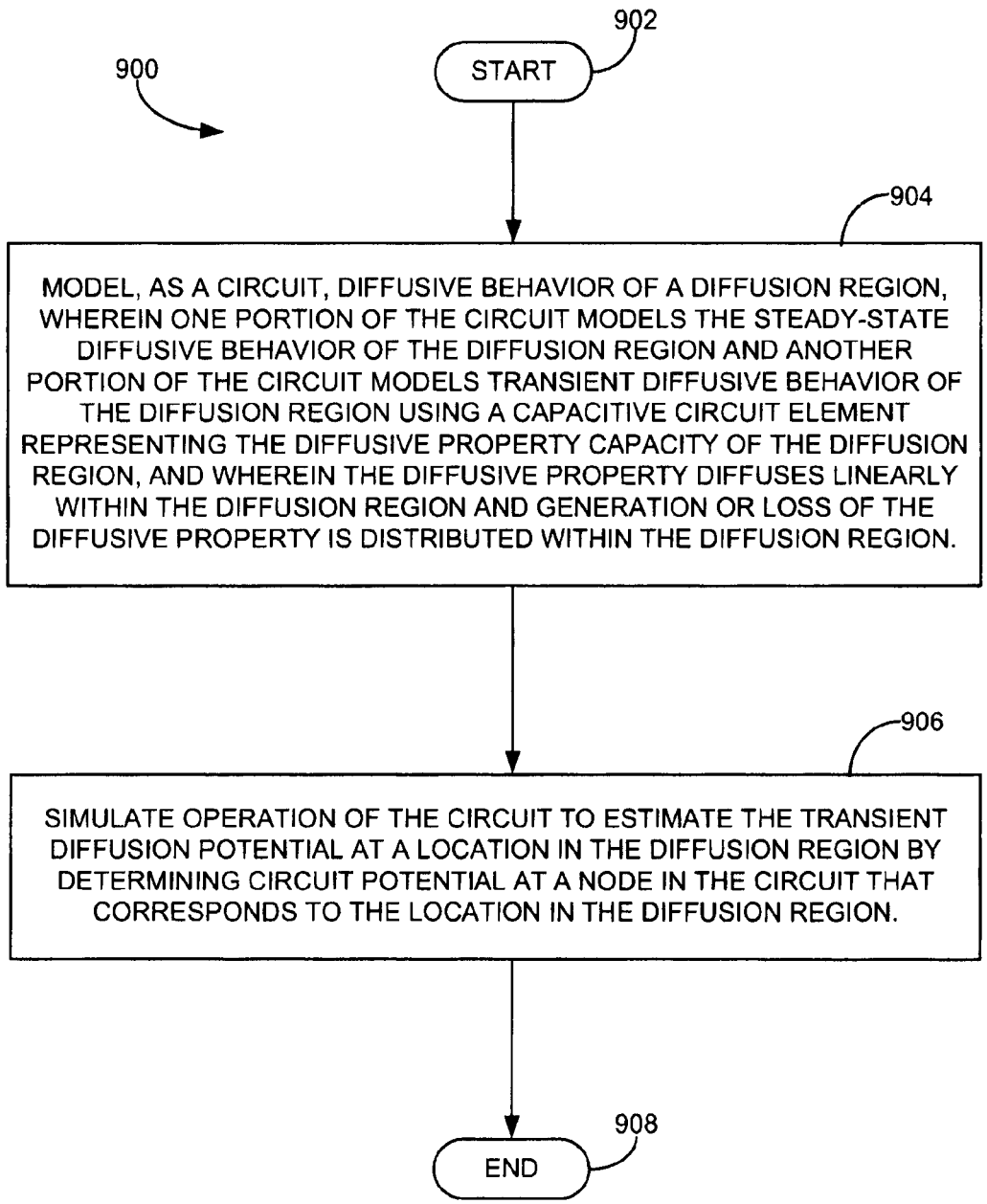
FIG. 9 shows a method for estimating a transient diffusion potential, according to another embodiment.

For example, the system 800 may be used to partially or entirely implement a method 900 for estimating a transient diffusion potential, as shown in FIG. 9. An engineer performing the method 900 begins at block 902 and proceeds to block 904 where he or she models, as a circuit, diffusive behavior of a diffusion region. As in the depicted embodiments, the diffusion region may be the resistor 100 and the diffusive behavior may be diffusion of heat throughout the resistor 100. One portion of the circuit, the steady-state portion 302, models the steady-state diffusive behavior of the diffusion region. Another portion of the circuit, the transient portion, models transient diffusive behavior of the diffusion region using a capacitive circuit element representing the diffusive property capacity of the diffusion region. In the depicted embodiments, the capacitive circuit element is the thermal capacitor γ. The diffusive property diffuses linearly within the diffusion region and is generated in a distributed manner within the diffusion region. That is, the embodiments described herein are generated by assuming that the diffusive property (such as heat) is generated throughout the diffusion region (such as Ohmic losses along the length of the resistor 100), as opposed to being generated simply at certain nodes of the resistor and then diffusing only from those nodes.

Once the circuit is modeled, the engineer proceeds to block 904 where he or she simulates operation of the circuit to estimate the transient diffusion potential at a location in the diffusion region by determining circuit potential at a node in the circuit that corresponds to the location in the diffusion region. An example of this is determining voltages at various nodes of the circuit 500 shown in FIG. 5, with the voltages being analogous to temperatures within the resistor 100. Simulating circuit operation is done with the help of a computer simulator such as SPICE.

The depicted embodiments model diffusive behavior using electric circuits. However, in alternative embodiments (not depicted), different types of circuits may be used. For example, a hydraulic circuit may be used in which the capacitive circuit element is a hydraulic accumulator. Also, while the depicted embodiment uses heat as an example of a diffusive property, temperature as an example of a diffusion potential, and a resistor as an example of a diffusion region, as mentioned above alternative embodiments are possible in which any one or more of the diffusive property, diffusion potential, and diffusion region are different. In these alternative embodiments, the capacitive circuit element represents not heat capacity as it does in the depicted embodiments but rather the diffusive property capacity. For example, in an embodiment in which the diffusive property is the number of particles of a gaseous product, the diffusion potential is concentration of the particles, and the diffusion region is a volume within a tube, and the mass-heat capacity product $m \cdot C_p$ in the depicted examples is unity.

Furthermore, while the depicted embodiments focus on generation of the diffusive property (heat generation), as mentioned above in alternative embodiments (not depicted) the diffusive property may be generated or lost. For example, instead of temperature within the resistor 100 rising, the temperature within the resistor 100 may decrease when $T(x) > T^{ref}$ and $G^{lat} > 0$. As another example, when a gaseous chemical product species is produced via a catalytic reaction of a reactant species on an interior surface of a tube, while the product species is generated the reactant species is lost. In this example, if $T(x)$ models the reactant species, $\Phi(x)$ may be negative to represent destruction of the reactant species and $f(X)$ can represent diffusion of the reactant species through porous walls out of the tube and into the ambient.

The circuits shown in FIGS. 3(*a*), (*b*), and 5 are examples of suitable circuits. In alternative embodiments (not depicted), alternative circuits may be used. For example, the values of the circuit elements may be modified to obtain less accurate, but still commercially usable, circuit potentials. Additionally or alternatively, various circuit transformations such as source transformations can be performed on the circuits to generate functionally equivalent circuits that are different in appearance.

For the sake of convenience, the example embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks or software modules can be implemented by themselves, or in combination with other operations in either hardware or software.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible. The scope of the claims should not be limited by the embodiments set forth in the examples, but should be given the broadest possible interpretation consistent with the description as a whole.

The invention claimed is:

1. A system for estimating a diffusion potential of a diffusive property, the system comprising:
   (a) a controller; and
   (b) a non-transitory computer readable medium communicatively coupled to the controller and having encoded thereon statements and instructions to cause the controller to perform a method comprising:
      (i) modeling, as a circuit, diffusive behavior of a diffusion region, wherein one portion of the circuit models the steady-state diffusive behavior of the diffusion region and another portion of the circuit models transient diffusive behavior of the diffusion region using a capacitive circuit element representing the diffusive property capacity of the diffusion region, wherein the diffusive property diffuses linearly within the diffusion region and generation of the diffusive property is distributed within the diffusion region; and
      (ii) simulating operation of the circuit to estimate the transient diffusion potential at a location in the diffusion region by determining circuit potential at a node in the circuit that corresponds to the location in the diffusion region.

2. The system of claim 1 wherein the circuit used to model the diffusive behavior is an electric circuit.

3. The system of claim 2 wherein the portion of the circuit that models the steady-state behavior of the diffusion region comprises a pi-network.

4. The system of claim 3 wherein the capacitive circuit element comprises two capacitors and wherein one of the capacitors is connected in parallel across each of the ports of the pi-network.

5. The system of claim 4 wherein the diffusion region is a resistor, the diffusion potential is temperature, voltage of the circuit models the temperature, charge of the circuit models heat, and the diffusive property capacity is heat capacity.

6. The system of claim 5 wherein the diffusion region is an IC interconnect.

7. The system of claim 5 wherein the resistor is adjacent an environment having a uniform reference temperature, and wherein lateral thermal conductance of the resistor relative to the environment is zero.

8. The system of claim 5 wherein the resistor is adjacent an environment having a uniform reference temperature, wherein lateral thermal conductance of the resistor relative to the environment is non-zero, and wherein modeling the temperature of the resistor comprises assuming that temperature distribution at any moment within the resistor is quasistatic.

9. The system of claim 5 wherein the resistor comprises a single electrical net.

10. The system of claim 5 wherein temperature along the length of the resistor is given by $$T(x) = \frac{T^L - T^\infty - (T^0 - T^\infty)\cosh(\xi L)}{\sinh(\xi L)}\sinh(\xi x) + (T^0 - T^\infty)\cosh(\xi x) + T^\infty$$

and average temperature is given by $$\overline{T} = (T^0 + T^L)\frac{\cosh(\xi L) - 1}{\xi L \sinh(\xi L)} + T^\infty\left(1 - 2\frac{\cosh(\xi L) - 1}{\xi L \sinh(\xi L)}\right),$$

wherein $\xi = \sqrt{(G^{lat}/G^{long})}$, $G^{lat}$ is lateral conductance of the resistor, $G^{long}$ is longitudinal conductance of the resistor, $L$ is length of the resistor, $T^0$ is temperature at one end of the resistor, $T^L$ is temperature at another end of the resistor, and $T^{ref}$ is environment reference temperature.

11. The system of claim 5 wherein temperature along the resistor is given by $$T(x) = \frac{I^2 R x^2}{2G^{long}} + \left(\frac{T^L - T^0}{L} + \frac{1}{2} \cdot \frac{\Phi L}{G^{long}}\right)x + T^0$$

and average temperature is given by $$\overline{T} = \frac{T^L + T^0}{2} + \frac{\Phi L^2}{12 G^{long}},$$

wherein $\xi = \sqrt{(G^{lat}/G^{long})}$, $T^\infty = \Phi/G^{lat} + T^{ref}$, $G^{lat}$ is lateral conductance of the resistor, $G^{long}$ is longitudinal conductance of the resistor, $L$ is length of the resistor, $T^0$ is temperature at one end of the resistor, $T^L$ is temperature at another end of the resistor, and $T^{ref}$ is environment reference temperature.

12. A non-transitory computer readable medium having encoded thereon statements and instructions to cause a controller to perform a method comprising:
   (a) modeling, as a circuit, diffusive behavior of a diffusion region, wherein one portion of the circuit models the steady-state diffusive behavior of the diffusion region and another portion of the circuit models transient diffusive behavior of the diffusion region using a capacitive circuit element representing the diffusive property capacity of the diffusion region, wherein the diffusive property diffuses linearly within the diffusion region and generation of the diffusive property is distributed within the diffusion region; and
   (b) simulating operation of the circuit to estimate the transient diffusion potential at a location in the diffusion region by determining circuit potential at a node in the circuit that corresponds to the location in the diffusion region.

13. The computer readable medium of claim 12 wherein the circuit used to model the diffusive behavior is an electric circuit.

14. The system of claim 13 wherein the portion of the circuit that models the steady-state behavior of the diffusion region comprises a pi-network.

15. The computer readable medium of claim 14 wherein the capacitive circuit element comprises two capacitors and wherein one of the capacitors is connected in parallel across each of the ports of the pi-network.

16. The computer readable medium of claim 15 wherein the diffusion region is a resistor, the diffusion potential is temperature, voltage of the circuit models the temperature, charge of the circuit models heat, and the diffusive property capacity is heat capacity.

17. The computer readable medium of claim 16 wherein the diffusion region is an IC interconnect.

18. The computer readable medium of claim 16 wherein the resistor is adjacent an environment having a uniform reference temperature, and wherein lateral thermal conductance of the resistor relative to the environment is zero.

19. The computer readable medium of claim 16 wherein the resistor is adjacent an environment having a uniform reference temperature, wherein lateral thermal conductance of the resistor relative to the environment is non-zero, and wherein modeling the temperature of the resistor comprises assuming that temperature distribution at any moment within the resistor is quasistatic.

20. The computer readable medium of claim 16 wherein the resistor comprises a single electrical net.

21. The computer readable medium of claim 16 wherein temperature along the length of the resistor is given by $$T(x) = \frac{T^L - T^\infty - (T^0 - T^\infty)\cosh(\xi L)}{\sinh(\xi L)}\sinh(\xi x)$$
$$+ (T^0 - T^\infty)\cosh(\xi x) + T^\infty$$

and average temperature is given by $$\bar{T} = (T^0 + T^L)\frac{\cosh(\xi L) - 1}{\xi L \sinh(\xi L)} + T^\infty\left(1 - 2\frac{\cosh(\xi L) - 1}{\xi L \sinh(\xi L)}\right),$$

wherein $\xi = \sqrt{(G^{lat}/G^{long})}$, $G^{lat}$ is lateral conductance of the resistor, $G^{long}$ is longitudinal conductance of the resistor, L is length of the resistor, $T^0$ is temperature at one end of the resistor, $T^L$ is temperature at another end of the resistor, and $T^{ref}$ is environment reference temperature.

22. The computer readable medium of claim 16 wherein temperature along the resistor is given by $$T(x) = \frac{I^2 R x^2}{2G^{long}} + \left(\frac{T^L - T^0}{L} + \frac{1}{2}\cdot\frac{\Phi L}{G^{long}}\right)x + T^0$$

and average temperature is given by $$\bar{T} = \frac{T^L + T^0}{2} + \frac{\Phi L^2}{12 G^{long}},$$

wherein $\xi = \sqrt{(G^{lat}/G^{long})}$, $T^\infty = \Phi/G^{lat} + T^{ref}$, $G^{lat}$ is lateral conductance of the resistor, $G^{long}$ is longitudinal conductance of the resistor, L is length of the resistor, $T^0$ is temperature at one end of the resistor, $T^L$ is temperature at another end of the resistor, and $T^{ref}$ is environment reference temperature.

23. A system for estimating a diffusion potential of a diffusive property, the system comprising:
(a) a controller; and
(b) a non-transitory computer readable medium communicatively coupled to the controller and having encoded thereon statements and instructions to cause the controller to perform a method comprising:
(i) modeling, as a circuit, diffusive behavior of a resistor, wherein a portion of the circuit models the steady-state diffusive behavior of the resistor and another portion of the circuit models transient diffusive behavior of the resistor using a capacitive circuit element representing the diffusive property capacity of the resistor, and wherein the diffusive property diffuses linearly within the resistor and generation or loss of the diffusive property is distributed within the resistor; and
(ii) estimating the diffusion potential at the endpoints of the resistor by simulating operation of the circuit and determining the circuit potential at nodes in the circuit that correspond to the endpoints of the resistor.

24. The system of claim 23 further comprising estimating the diffusion potential at a location within the resistor from the diffusion potential at the endpoints of the resistor.

25. The system of claim 24 wherein the circuit is an electric circuit and the circuit potential is voltage.

26. The system of claim 24 wherein the diffusive property is transient heat and the diffusive property capacity is heat capacity.

27. The system of claim 26 wherein the capacitive circuit element is selected such that the heat capacity of the resistor is scaled by a factor representing a quasistatic temperature trajectory between the two nodes of the resistor.

28. The system of claim 27 wherein the resistor is a via and the factor is approximately 0.5.

29. The system of claim 27 wherein the resistor has:
(a) $G^{lat} \neq 0$;
(b) a temperature distribution $$T(x) = \frac{T^L - T^\infty - (T^0 - T^\infty)\cosh(\xi L)}{\sinh(\xi L)}\sinh(\xi x); \text{ and}$$
$$+ (T^0 - T^\infty)\cosh(\xi x) + T^\infty$$

(c) the factor is $$\frac{\cosh(\xi L) - 1}{\xi L \sinh(\xi L)}.$$

30. A non-transitory computer readable medium having encoded thereon statements and instructions to cause a controller to perform a method comprising:
(a) modeling, as a circuit, diffusive behavior of a resistor, wherein a portion of the circuit models the steady-state diffusive behavior of the resistor and another portion of the circuit models transient diffusive behavior of the resistor using a capacitive circuit element representing the diffusive property capacity of the resistor, and wherein the diffusive property diffuses linearly within the resistor and generation or loss of the diffusive property is distributed within the resistor; and
(b) estimating the diffusion potential at the endpoints of the resistor by simulating operation of the circuit and determining the circuit potential at nodes in the circuit that correspond to the endpoints of the resistor.

31. The computer readable medium of claim 30 further comprising estimating the diffusion potential at a location within the resistor from the diffusion potential at the endpoints of the resistor.

32. The computer readable medium of claim 31 wherein the circuit is an electric circuit and the circuit potential is voltage.

33. The computer readable medium of claim 31 wherein the diffusive property is transient heat and the diffusive property capacity is heat capacity.

34. The computer readable medium of claim 33 wherein the capacitive circuit element is selected such that the heat capacity of the resistor is scaled by a factor representing a quasistatic temperature trajectory between the two nodes of the resistor.

35. The computer readable medium of claim 34 wherein the resistor is a via and the factor is approximately 0.5.

36. The computer readable medium of claim 34 wherein the resistor has:

(a) $G^{lat} \neq 0$;

(b) a temperature distribution $$T(x) = \frac{T^L - T^\infty - (T^0 - T^\infty)\cosh(\xi L)}{\sinh(\xi L)}\sinh(\xi x); \text{ and}$$
$$+ (T^0 - T^\infty)\cosh(\xi x) + T^\infty$$

(c) the factor is $$\frac{\cosh(\xi L) - 1}{\xi L \sinh(\xi L)}.$$

* * * * *